Sept. 29, 1964     P. N. BRAUN ETAL     3,150,577
MACHINE FOR AFFIXING IDENTIFICATION TAGS TO GARMENTS
Filed Feb. 13, 1962     12 Sheets-Sheet 1

FIG.1

INVENTORS:
PHILIP N. BRAUN,
JAMIESON A. FILSINGER,
BY *D. Emmett Thompson,*
THEIR ATTORNEY.

FIG.2.

Sept. 29, 1964   P. N. BRAUN ETAL   3,150,577
MACHINE FOR AFFIXING IDENTIFICATION TAGS TO GARMENTS
Filed Feb. 13, 1962                                    12 Sheets-Sheet 9

INVENTORS:
PHILIP N. BRAUN,
JAMIESON A. FILSINGER,

BY  D. Emmett Thompson,
THEIR ATTORNEY.

Sept. 29, 1964  P. N. BRAUN ETAL  3,150,577
MACHINE FOR AFFIXING IDENTIFICATION TAGS TO GARMENTS
Filed Feb. 13, 1962  12 Sheets-Sheet 10

INVENTORS:
PHILIP N. BRAUN,
JAMIESON A. FILSINGER,
BY *D. Emmett Thompson*,
THEIR ATTORNEY.

FIG.16

Sept. 29, 1964  P. N. BRAUN ETAL  3,150,577
MACHINE FOR AFFIXING IDENTIFICATION TAGS TO GARMENTS
Filed Feb. 13, 1962  12 Sheets-Sheet 12

INVENTORS:
PHILIP N. BRAUN,
JAMIESON A. FILSINGER,
BY *D. Emmett Thompson*
THEIR ATTORNEY.

United States Patent Office 3,150,577
Patented Sept. 29, 1964

3,150,577
MACHINE FOR AFFIXING IDENTIFICATION
TAGS TO GARMENTS
Philip N. Braun, 237 Robineau Road, Syracuse, N.Y., and Jamieson A. Filsinger, Syracuse, N.Y.; said Filsinger assignor to said Philip N. Braun, Syracuse, N.Y.
Filed Feb. 13, 1962, Ser. No. 172,979
7 Claims. (Cl. 93—88)

This invention has to do with the temporary identification of articles of laundry and dry cleaning. The proper identification of articles in laundries and dry cleaning plants presents a problem of considerable magnitude. This is particularly so where the articles are picked up from a large number of stores. That is, the customer takes the laundry, or dry cleaning, to a store in his neighborhood and later, the dry cleaning plant collects the articles from the various stores, processes them, and returns them to the stores where they may be obtained by the customer. Obviously, the identification indicia has to be affixed to the articles at the stores, or place where they are initially received. The identification indicia has to be such that the articles can be kept track of in the processing plant, including the segregation of the processed articles for delivery to the proper store, and for return of the proper articles by the store to the customer.

A number of identification arrangements and systems are now in use but fall far short of what is desired, resulting in mix-ups and occasionally, in the loss of garments. One of the chief disadvantages of present identification systems is the cost involved due to the large inventory of tags, or rolls of tape from which the tags are formed, and the necessity of selecting the right kind, or type, of tag for use at a particular time.

Our invention has as an object a laundry identification arrangement, or system, wherein the inventory of identification tags is reduced materially, up to ninety percent for large laundry and dry cleaning plants, and wherein the garment will be always specifically identified regardless of the volume of business the plant is doing when the article is received, etc.

The invention has as a further object a novel form of tag and a unique tag affixing machine, whereby the affixing of the individual tags to the articles is convenient and free from error, the affixed tag bearing complete identifying indicia, so that a particular garment, of ten thousand garments being processed, will be specifically identified in respect to all of the remaining ten thousand garments, all of the identifying tags being formed from one type of pad of tag strips.

The invention has as a further object an identification tag applying machine of simplified form operable to sever tags from the strip, form additional indicia to that preprinted on the tag, and affix the tag to the garment.

The invention has as a further object a tag affixing machine embodying an arrangement whereby an additional flag tag is simultaneously affixed to the article.

The invention consists in the novel features and in the combinations and constructions hereinafter set forth and claimed.

In describing this invention reference is had to the accompanying drawings in which like characters designate corresponding parts in all the views.

The identification tags are formed from integral strips, each providing ten tags. There are ten of these strips, see FIGURE 16, in the form of a sheet. The strips are attached at like ends, preferably the ends containing the highest piece number printed on each strip, to a marginal portion 20. Each set of strips contains ten strips and are preferably formed of colored paper, or like material. The first sheet of strips is separated by an interliner 21, and the second sheet is separated from the third sheet of strips by an interliner. There are ten sheets of strips bound or adhered together by the marginal portions 20 to form a pad.

Figure 16:
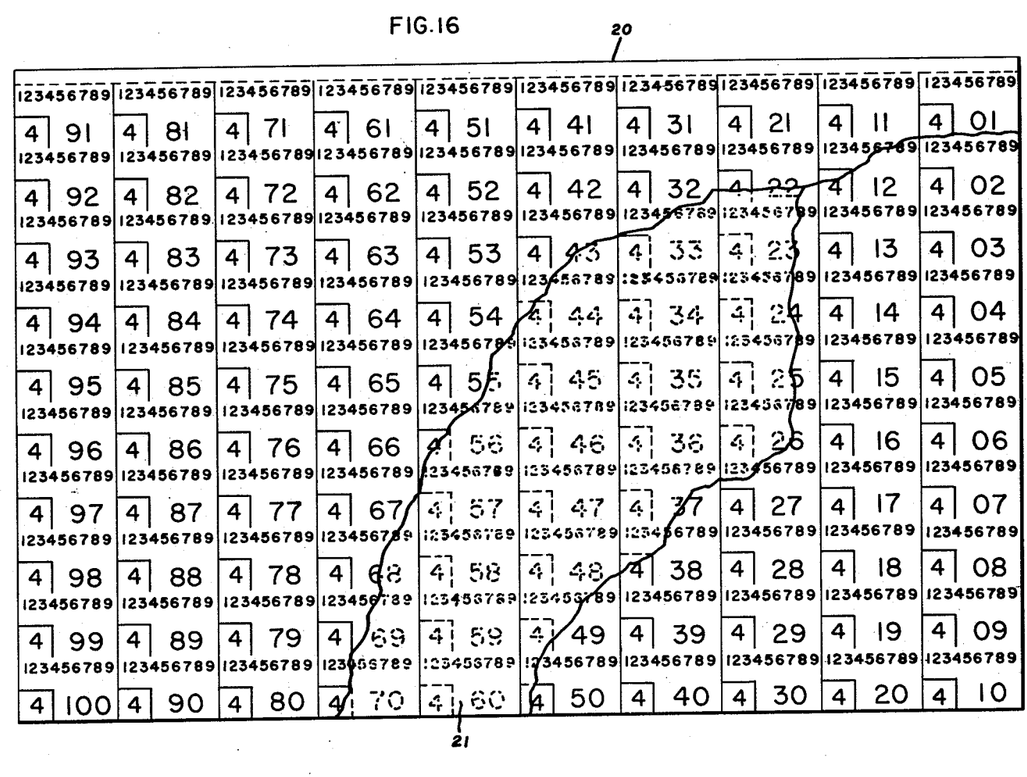
FIGURE 16 is a face view of the pad of strips from which the tags are formed.

There is printed on each strip in the pad, at the left in each tag area, or portion, a relatively large number, as the number 4, FIGURE 16. This number appears on all tag portions of all strips in the pad and may designate the number of the store from which the articles are picked up.

In the right area of each tag portion appears a large number, as the number 01. These numbers are piece numbers and therefore, they run consecutively from 01 to 100 on each sheet of tag strips. That is—these piece numbers on the right hand strip, FIGURE 16, run from 01 to 10. On the next adjacent strip, they run from 11 to 20; the third strip 21 to 30, etc., the last strip running from 91 to 100, whereby from each sheet of strips, one hundred tags can be formed, numbered consecutively from 1 to 100. As previously stated, each sheet is of a different color and the one hundred tags from that sheet can identify one hundred pieces of a lot.

There is also printed on each tag portion in the top are therefore, a row of small numbers, as from 1 to 9. The purpose and function of these numbers will be explained later on.

Figure 1:
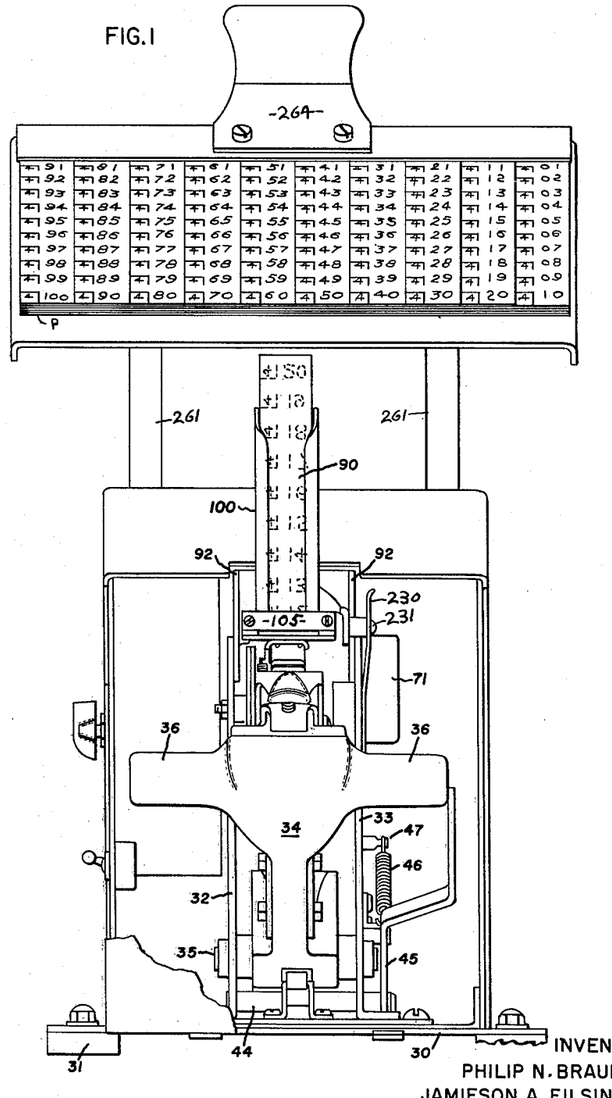
FIGURE 1 is a front elevational view of the tag affixing machine embodying our invention, with the tag strip elevated above the strip stop, and the front wall of the casing removed.
Figure 2:
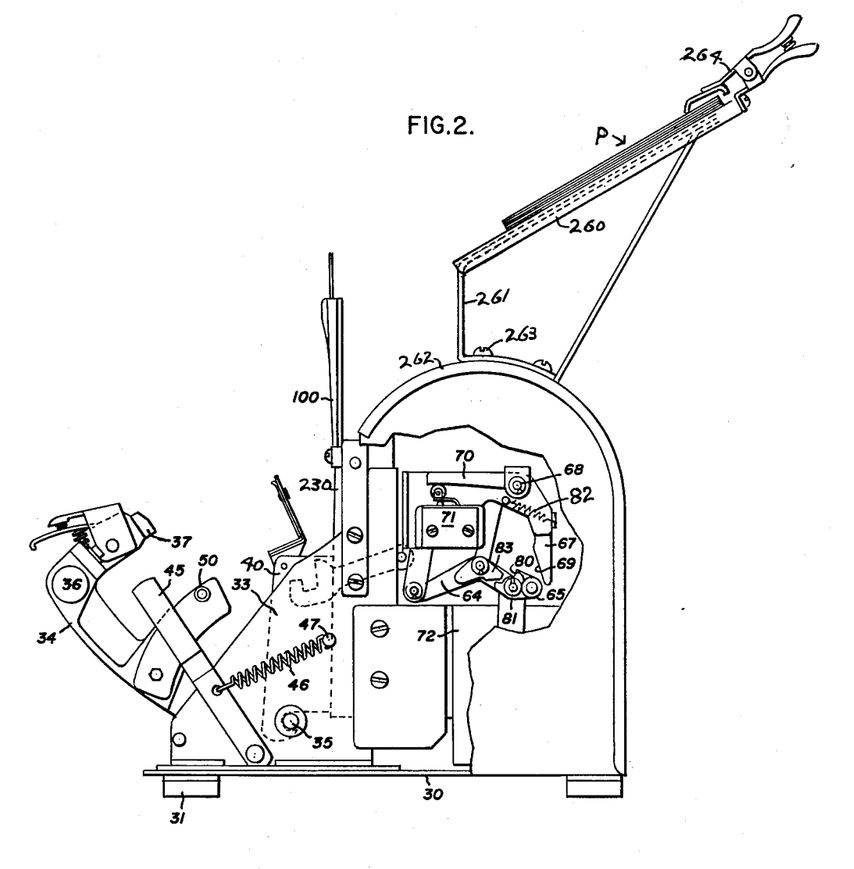
FIGURE 2 is a side elevational view looking to the left in FIGURE 1, and with a portion of the side of the casing broken away.

Referring to FIGURES 1 and 2, the machine consists of a base 30 supported by feet 31. Side plates 32, 33, are fixed to the base and extend upwardly therefrom in spaced apart relation. A garment supporting arm 34 is mounted at its lower end for pivotal movement about a shaft 35 mounted in the side plates 32, 33. The arm 34 is formed at its upper end with laterally extending projections 36 to provide handles for conveniently manually moving the arm upwardly, about its pivot 35, to move the garment platen 37 in juxtaposition to the tag affixing means. In this disclosure, the tag is affixed to the garment G, FIGURE 5, by being stapled to the garment. The head portion of the stapler, in which the staple driving member is slidably mounted, is supported on the upper end of a staple magazine 38 which is affixed to the rear side of a supporting block 40, the lower end of which is formed with a hook 41 positioned on the shaft 35. The stapler is held in operative position by a blade 43 fixed at its lower end to a shaft 44, to one end of which is fixedly secured a lever 45. A tension spring 46 is secured at one end to the lever 45 and at its opposite end to a pin 47 mounted on the side plate 33 of the machine frame, see FIGURES 1 and 2. The spring 46 urges the blade 43 against the outer or face side of the stapler supporting block 40 to hold the stapler in proper position in the machine. When the lever 45 is pulled forwardly to move the blade 43 away from the stapler, it may be swung outwardly about the shaft 35 and unhooked therefrom.

Figure 3:
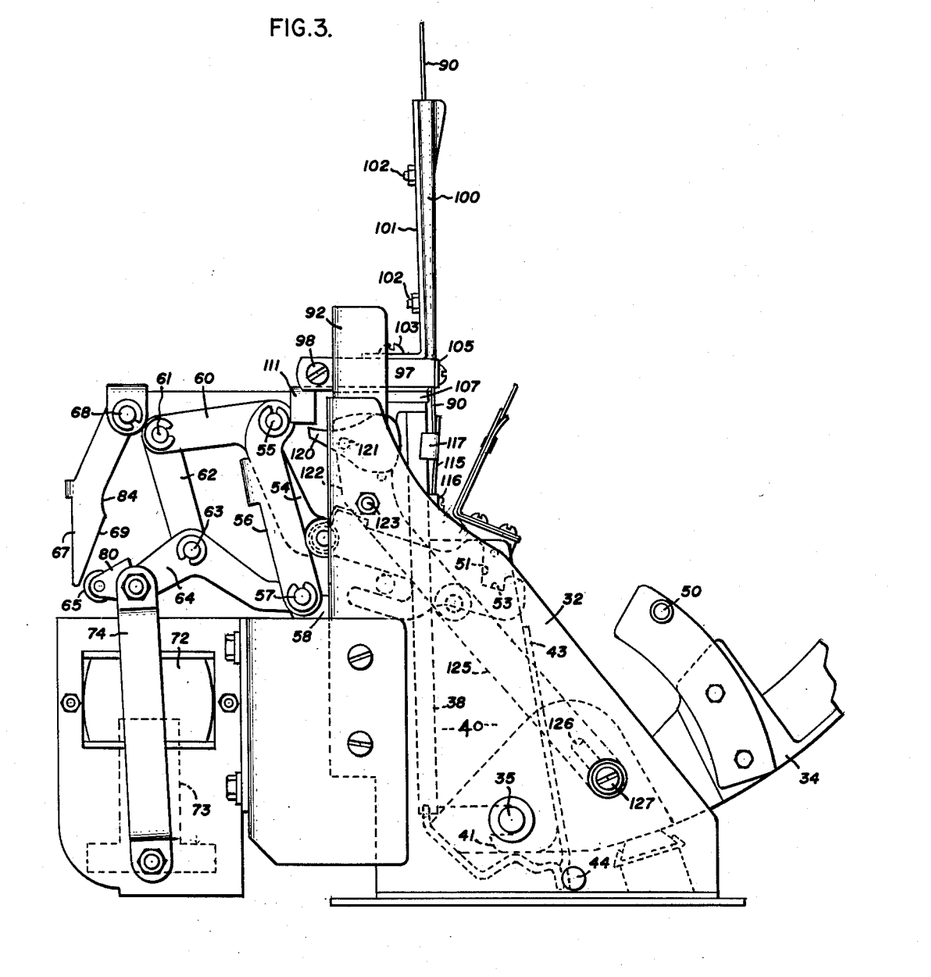
FIGURE 3 is a side elevational view of the machine looking to the right, FIGURE 1, with the casing removed and with the garment supporting arm in full retracted position.
Figure 4:
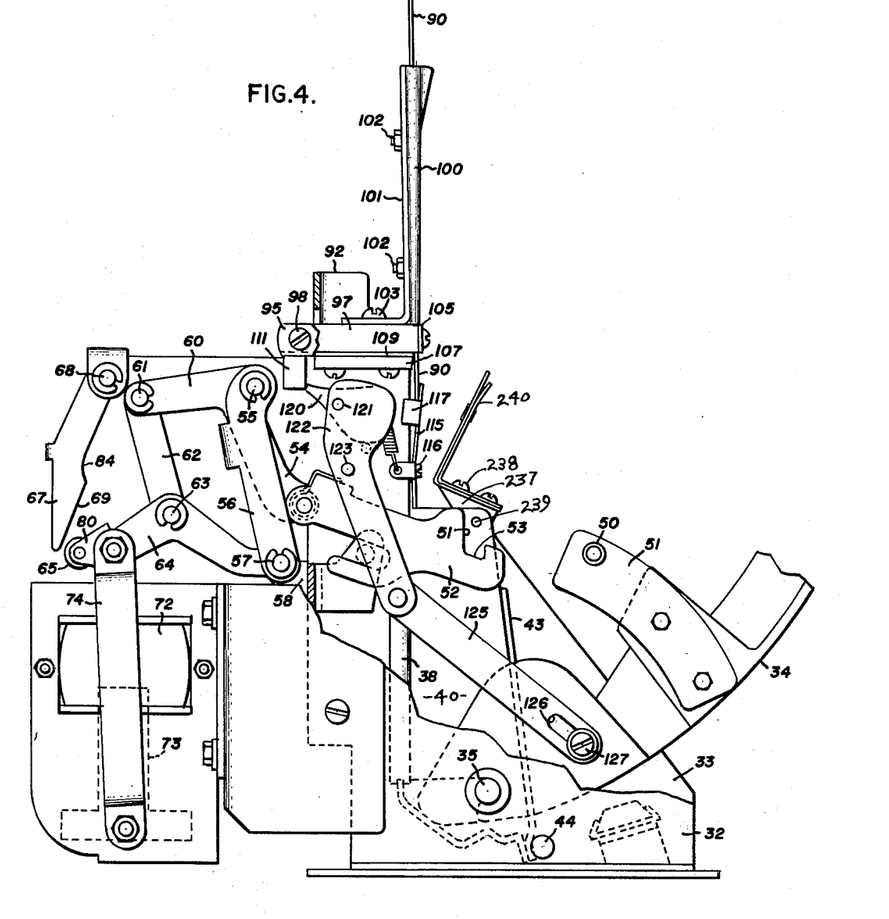
FIGURE 4 is a view, similar to FIGURE 3, with the garment supporting arm partially but not in full retracted position.
Figures 12, 18:
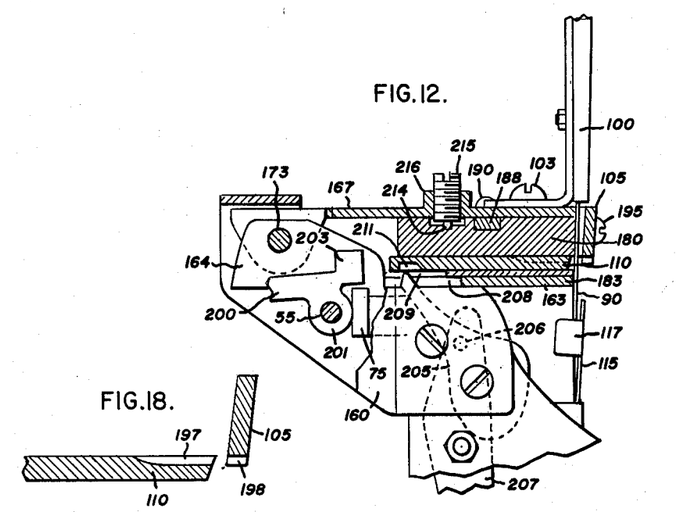
FIGURE 12 is a sectional view of the shearing structure taken on a line corresponding to line 12—12, FIGURE 11.
FIGURE 18 is an enlarged medial sectional view through the shear block and shear bar of the arrangement shown in FIGURES 12–13.
Figure 13:
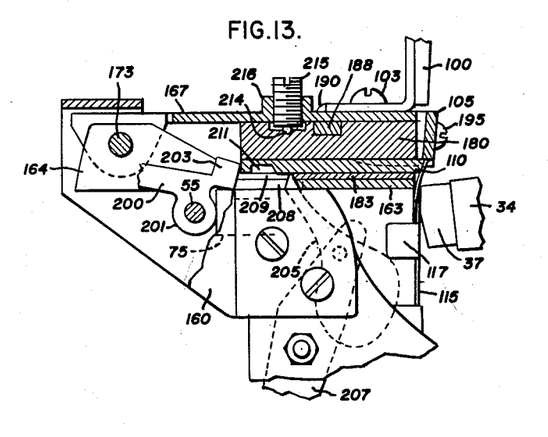
FIGURE 13 is a view, similar to FIGURE 12, showing the shear moved to shearing position.

The garment supporting arm 34 is moved from the position shown in FIGURES 3 and 4 upwardly toward the stapler by manual manipulation. As the arm is moved upwardly to bring the platen 37 in proximity to the stapler, pins 50 engage surfaces 51 formed on links 52. The surfaces 51 extend upwardly from notches 53. The links 52 are moved rearwardly by the pins 50, moving the leg 54 of an angle lever pivoted at its bight on a pin 55 carried by the upper ends of links 56, which, in turn, are pivoted on a pin 57 carried by a bracket 58 fixedly secured to the machine frame, see FIGURES 4 and 5. This effects upward movement of the leg 60 of the angle lever. The leg 60 is pivotally connected, as at 61, to a link 62 pivotally connected at its lower end by a pin 63 to a link 64. The link 64 is pivotally mounted on the pin 57 and carries at its free end a roller 65 which, by the linkage described, moves upwardly from continued forward movement of the garment supporting arm and engages a depending leg 67 of an angle lever mounted on a fixed pivot 68, FIGURE 4. Because of the inclined surface 69 of leg 67, the leg 67 is moved rearwardly and the other leg 70 of the angle lever, see FIGURE 2, is moved downwardly to close the contacts of a switch 71. This switch, in closed position, supplies current to the solenoid coil 72, FIGURE 4, drawing the core 73 upwardly. The core 73 is connected by links 74 to the link 64. This effects clockwise movement of the linkage 56, 60, 64, about the pivot pin 57 to move the pin 55 into engagement with the driver 75 of the stapler to move it forwardly to drive the staple through a tag and the garment on the platen 37. When the pins 50 engage the surfaces 51 and move links 52 rearwardly, the forward ends of these links move upwardly so pins 50 are engaged by the notches 53. Accordingly, when the linkage 56, 60, 62, 64 is moved clockwise by the solenoid 72, from the position FIGURE 4 to that shown in FIGURE 5, a squeezing force is applied between the pin 55 and the platen 37, or in turn between the platen 37 and the staple driver 75, to drive and clinch the staple. The staple driver 75 is better shown in FIGURES 12 and 13 disclosing a modified form of the invention. The roller 65 is not mounted directly on the end of the link 64, but is mounted on a piece 80 pivotally connected to the link 86, see FIGURE 2. Movement of the piece 80 in a clockwise direction, FIGURE 2, is controlled by a stop piece 83 fixed to the link 64. The inclined surface 69 of leg 67 merges at its upper end with a rearwardly curved surface 84. As the piece 80 is moved upwardly by the solenoid 74, the roller 65 moves the leg 67 rearwardly to actuate the switch 71, as explained, and as the staple is driven, the roller 65 is positioned in the rearwardly curved surface 84 whereupon the piece 80 moves in counter-clockwise direction, FIGURE 2, to permit forward movement of the leg 67, under the influence of spring 82, to open the contacts of switch 71. Upon subsequent downward movement of the link 64, the piece 80 carrying the roller 65 has moved upwardly to permit the roller 65 to pass downwardly of the surface 69 without effecting rearward movement of the leg 67. Accordingly, as the garment supporting arm has been moved upwardly toward the tag affixing means, or the stapler, to effect rearward movement of the links 52, power is applied in the form of an impulse to the solenoid 72 to move the staple driver 75 forwardly at which time the pin 50 have dropped into the notches 53 to connect the garment supporting arm 34 to the linkage described whereby the squeezing action takes place between the platen 37 and the stapler head. The platen 37 is in the form of a staple clinching anvil so that the legs of the staple driver through the tag and the garment are bent over, or clinched to fix the tag to the garment.

The machine this far described is shown in Patent 2,796,607, issued June 25, 1957, to Herbert E. Bridgewater and John F. Filsinger.

An important feature of this invention resides in a shear structure mounted above the stapler, or tag affixing means, and from which upwardly extends a guide for guiding a tag strip 90 in overlying relation to the stapler head. Referring to FIGURES 1 to 8, the shear structure consists of a channel shaped piece, the sides 92 of which are fixedly secured to the upper ends of the sides 32, 33, of the machine frame as by screws 94. The sides 92 are formed with rearwardly extending portions 95, see FIGURES 4 and 6. A block 97 is positioned between the ears 95 and is pivotally connected thereto by screws 98.

A guide member 100 is mounted at the forward edge of the block 97, and extends upwardly therefrom. The guide 100 is attached to an angle bracket 101 by screws 102, and the bracket is fixed to the upper surface of the block 97 by screws 103. The forward edge of the block beneath the guide 100 is recessed, as at 104, FIGURE 8, to provide in conjunction with a shear bar 105 a continuation of the guide.

A plate 107 is fixed to the underside of the block 97 by screws 108 threading into the block 97. There is a spacer 109 mounted intermediate the block 97 and the plate 107, adjacent the side edges thereof, to provide a space for slidably receiving a shear block 110. The shear 110 is in the form of a flat blade formed with portions 111, 112, depending from the side edges adjacent the rear end of the shear.

A tag strip 90 is inserted in the guide 100 and descends by gravity against a stop, here shown in the form of a blade 115 fixed to the front side of the stapler magazine 38, as by screws 116. The blade 115 is formed of thin resilient metal, and normally diverges outwardly and upwardly from its fastening point 116, the intermediate portion of the blade being formed at its side edges with ears 117 extending rearwardly, and which are engaged by the lower edge of the tag strip 90. This stop arrangement is positioned to bring the lowermost tag portion of the strip in overlying registration with the stapler, whereby when the arm 34 with the garment G thereon is pressed against this lowermost tag portion, see FIGURE 5, the machine is actuated to staple that tag portion to the garment.

The shear 110 is operated simultaneous with the staple driver 75 by the depending ear portions 111 of the shear blade being engaged by the ends of the pin 55 of the linkage previously described. As the pivot pin is moved forwardly by operation of the solenoid 72, the shear 110 is moved forwardly from the position shown in FIGURE 8 into shearing engagement with the lower edge of the fixed shear bar 105, as shown in FIGURE 5.

Figure 5:
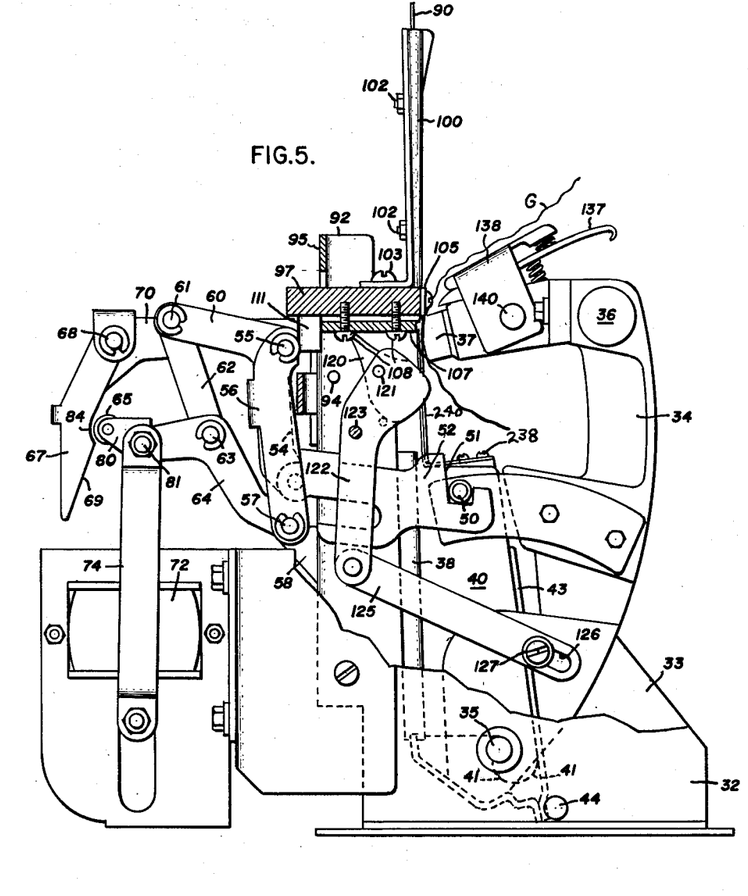
FIGURE 5 is a view, similar to FIGURES 3 and 4, showing the garment supporting arm moved in juxtaposition to the tag affixing means for the attachment of the tag to the garment.
Figure 6:
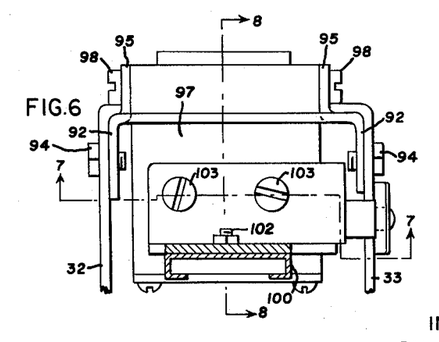
FIGURE 6 is a top plan view of the shear structure with the strip guide in section.
Figure 7:
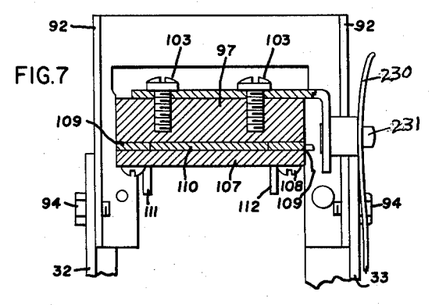
FIGURE 7 is a view taken on line 7—7, FIGURE 6.
Figure 8:
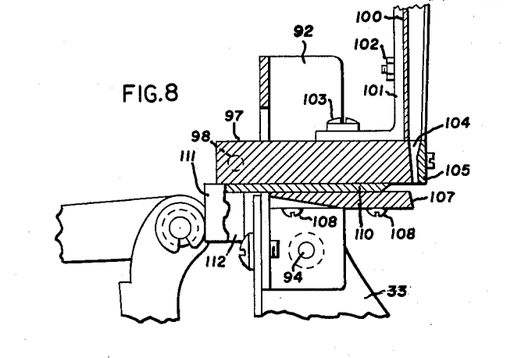
FIGURE 8 is a view taken on line 8—8, FIGURE 6.
Figure 9:
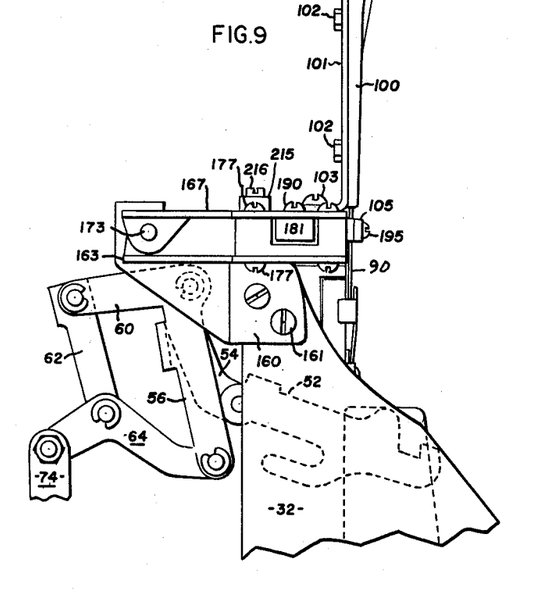
FIGURE 9 is a side elevational view of the upper portion of the machine and wherein the shear structure includes means for forming additional identifying indicia on the tag by removing a portion of the tag by forming a notch along the severed edge thereof, or by perforating the same, said notch or perforation being located in any one of a plurality of preselected positions on said tag.
Figure 10:
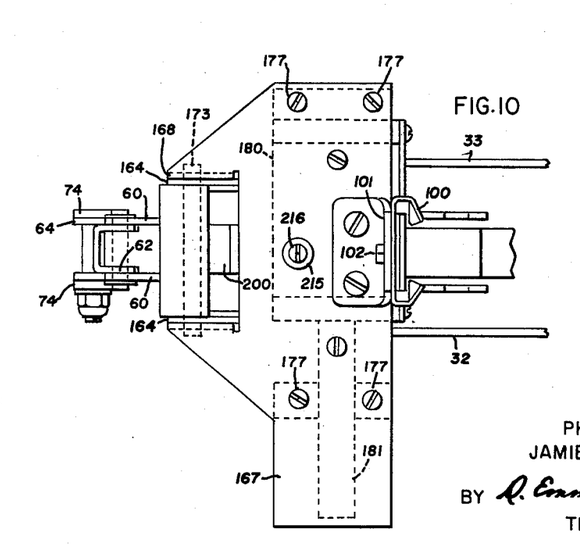
FIGURE 10 is a top plan view of the structure shown in FIGURE 9.

The shear 110 is moved rearwardly from the shearing position by means of a pawl 120 pivotally mounted as at 121, FIGURE 5, to the upper end portion of a link 122. The link 122 is mounted on a fixed pivot 123 carried by the frame side member 32. The link 122 extends downwardly an appreciable distance from the pivot 123, and is pivotally connected to a link 125, the lower end of which is formed with an elongated slot 126 for the reception of a pin 127 fixed to the garment supporting arm 34.

When the garment supporting arm 34 is moved forwardly for the affixing of a tag to a garment, the link 122 is rotated in a clockwise direction about its pivot 123, moving the pawl 120 forwardly to the position shown in FIGURE 5. This permits forward movement of the shear blade 110 from the position shown in FIGURE 8 to the position shown in FIGURE 5, to sever the lowermost tag portion of the strip 90 resting on the stop 117. Retrograde, or outward movement of the arm 34 from the stapler effects counterclockwise rotation of the link 122, FIGURE 5, and when the arm 34 has been moved to complete outward position, FIGURE 3, the pawl 120 drops out of engagement with the shear ear 111.

However, the linkage arrangement, including the elongated slot 126, is such that the garment supporting arm 34 may be moved outwardly from the stapler a substantial distance before the forward cutting edge of the blade 110 is moved out of shearing relationship with the shear bar 105, see FIGURE 4. The purpose of this arrangement is to permit a second staple to be driven through a tag. After the first staple has been driven through the garment and tag, the arm 34 may be moved outwardly a distance, and the finger piece 137 depressed, moving the housing 138 about its pivot 140. This results in slightly elevating the garment G and the tag already stapled thereto relative to the platen 37. Then, upon the second forward movement of the arm 34, the machine will function to drive a second staple through the tag and garment. The driving of this second staple taking place without retracting the shear blade 110, whereby the remaining portion of the tag strip 90 is not permitted to descend against the stop 117. However, when the arm 34 is moved to full out position, FIGURE 3, the shear blade 110 will have been moved rearwardly out of engagement with the shear bar 105, permitting the tag strip 90 to descend against the stop 17, presenting a new tag portion in overlying registration with the stapler.

Figure 14:
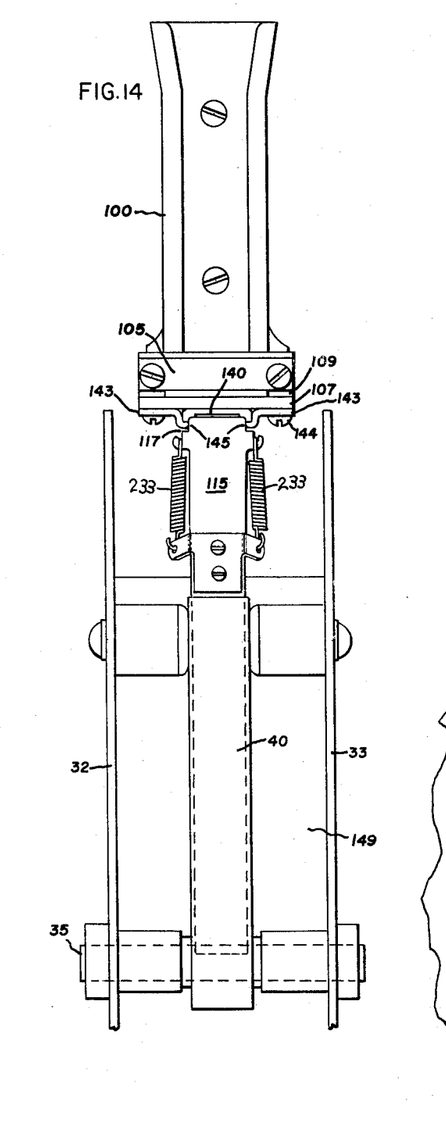
FIGURE 14 is a front elevational view of a modified form wherein the shear structure and guide are attached directly to the stapler.
Figure 15:
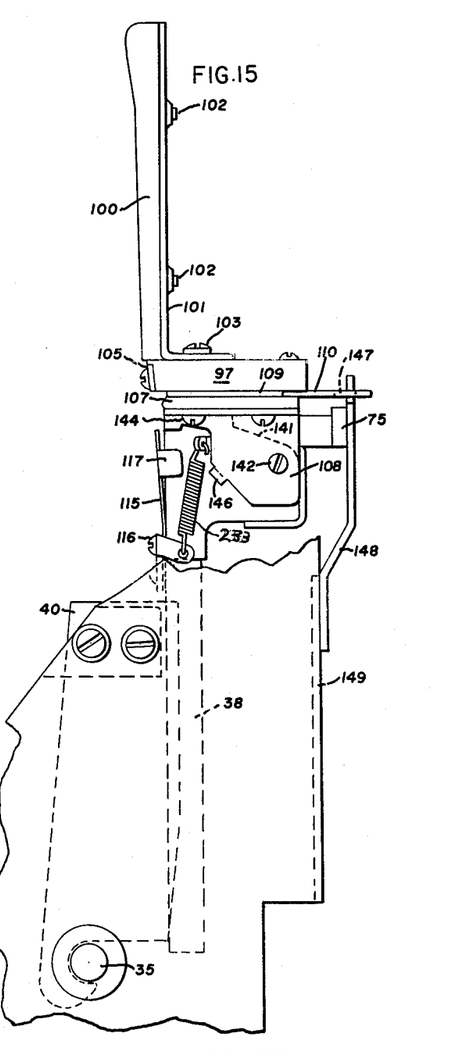
FIGURE 15 is a side elevational view of the arrangement shown in FIGURE 14, with a portion of the side of the machine frame broken away.

It is apparent the machine described functions to sever the lowermost tag portion from the strip 90 and affix it to the garment. A modified structure of the machine is shown in FIGURES 14 and 15. In this arrangement, the shear structure and strip guide are attached directly to the head portion of the stapler. In staplers of this type, it is conventional to provide the top, or end plate 140 with side flanges 141, FIGURE 15, pivotally mounted on screws 142 threading into the stapler head. This is to permit the end plate 140 to be swung upwardly away from the end of the magazine to clear out jammed staples in the discharge passage through which the staples are driven.

In the arrangement shown in FIGURES 14, 15, the plate 107 is fixed to side brackets 108 pivotally mounted on the screws 142, and having out-turned flanges 143 provided with apertures to receive screws 144, which extend through the plate 107, the spacer strips 109, and thread into the block 97. These brackets are formed with inwardly extending ears 145 engaging the under side edges of the stapler head plate 140, and also ears 146 engaging the forward lower inclined edges of the flanges 141, so when the shear structure is moved rearwardly about the pivot screws 142, the end plate 140 moves with the shear mechanism.

The shear 110 is slidably mounted between the block 97 and the plate 107, as previously described. However, this machine as disclosed is not power operated. The shear blade 110 extends rearwardly from the shear structure and is formed with an aperture 147. A bracket 148 is fixedly secured to a connecting wall 149 extending between the frame side plates 32, 33. The bracket 148 extends upwardly through the aperture 147 in the shear blade 110. When the garment supporting arm 34 is moved into engagement with the stapler, the stapler is moved rearwardly about the shaft 35. Inasmuch as the staple driver 75 is restrained from rearward movement by the fixed bracket 148, a staple is driven through the garment and tag and, at the same time, the bracket 148 serves to limit rearward movement of the shear blade 110, whereby the shear bar 105 is moved into shearing relation to the forward edge of the blade, thus severing the tag from the strip 90. This structure provides a particularly economical and compact arrangement for use in stores or places that receive only an occasional delivery of garments to be tagged.

Figure 11:
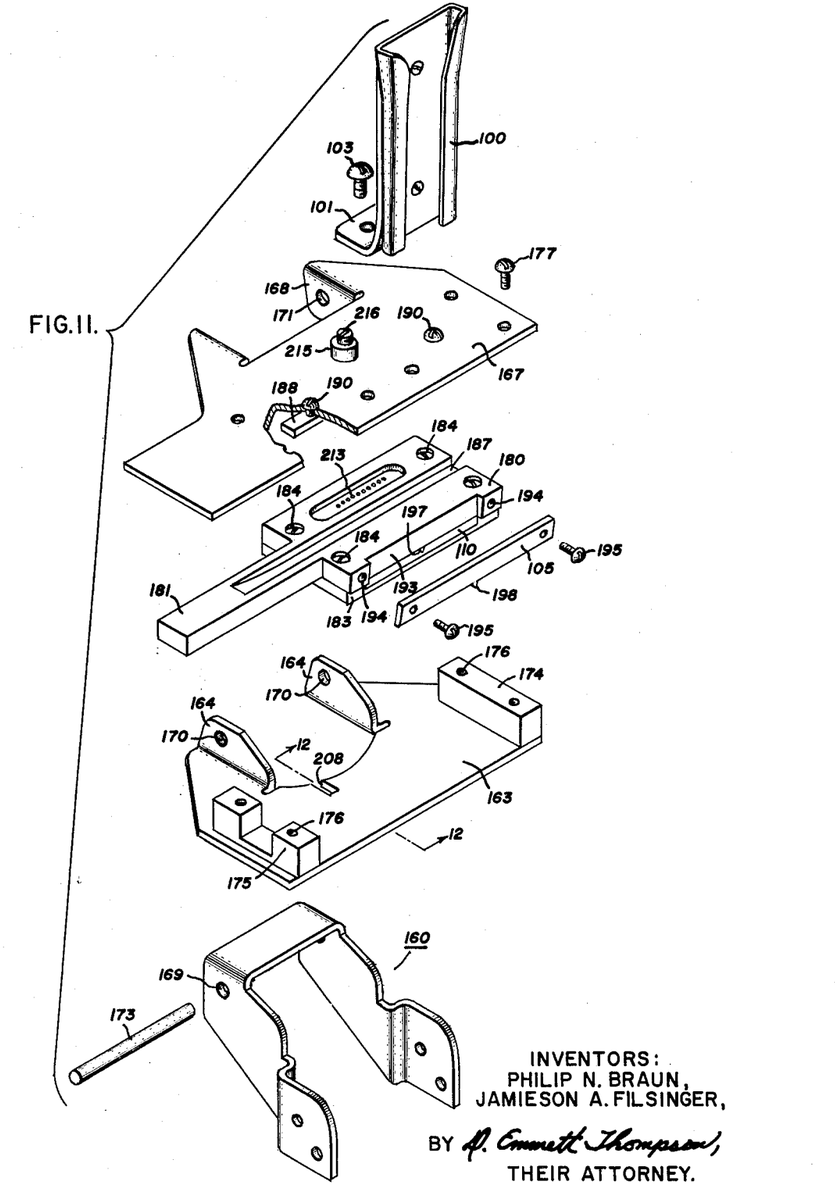
FIGURE 11 is an exploded view of the shearing and perforating structure shown in FIGURES 9 and 10.

In FIGURES 9-13, the machine includes means for forming additional identifying indicia on the severed tag. In this arrangement, a U-shaped bracket 160, FIGURE 11, is fixed to the upper ends of the frame side plates 32, 33, as by screws 161, FIGURE 9. A lower plate member 163 is formed in its rear side with a concavity and with flanges 164 extending upwardly from the plate at the ends of the concavity. The flanges 164 are positioned over the rear portion of the bracket 160.

An upper plate 167, of generally rectangular shape, is formed with a pair of spaced apart depending ears 168 which are positioned to overlap the ears 164 on the plate 163. The bracket 160 is formed in its sides with apertures 169. The ears 164 on plate 163 are formed with similar apertures 170, and the ears 168 of plate 167 are formed with apertures 171. These apertures are all arranged in alignment to receive a mounting pin 173.

A spacer block 174 is positioned on the right end portion of the plate 163, and a block 175 is positioned on the opposite end of the plate. These blocks are formed with threaded apertures 176 to receive screws 177 by means of which the plates 163, 167 are secured together in spaced apart relation to provide a unit movable about the pivot pin 173.

A block 180 is positioned between the plates 163, 167, and is formed with a projecting portion 181 extending laterally from the left end of the block. A plate 183 is fixedly secured to the under side of the block 180 and the central portion of this plate is recessed to provide a rectangular slot in which the shear plate 110 is slidably mounted. The plate 183 is secured to the block 180, as by screws 184, see FIGURE 11.

The upper surface of the block 180 is formed with a lengthwise extending groove 187 to receive a gib 188 fixed to the under side of the top plate 167, as by screws 190.

The forward edge of the block is recessed as at 193, and the front edge of the block 180, at the ends of the recess 193, is drilled and tapped to provide threaded apertures 194 to receive screws 195, by means of which the shear bar 105 is affixed to the block with the lower edge of the bar in shearing relation to the upper edge, or surface, of the blade 110, in the manner of the shear mechanisms previously described.

The length of the recess 193, the width of the blade 110, and the length of the shear bar 105 are at least twice the width of the strip 90, and the spacing between the blocks 174, 175 is such as to permit comparable movement of the block 180.

In this arrangement, the shear blade is formed in its top surface midway between its side edges with a V-notch 197 and the shear bar 105 is formed, on its under shearing edge, with a depending V-shaped projection 198 complemental in form and dimension to the notch 197 and adapted to cooperate therewith during the tag-severing operation to remove a portion of the tag along the severed edge thereof to form additional identifying indicia on the severed tag. The bar 105 is attached to the block 180 so that the projection 198 is positioned in shearing relation to the notch 197 in the shear blade 110.

In this structure, the shear mechanism including the block 180, blade 110, shear bar 105 is movable in a direction transversely of the tag strip 90 between the plates 163, 167. This movement is limited by the spacer blocks 174, 175. In this structure, the tag strip guide 100 is affixed to the bracket 101 and the bracket 101 fixedly secured to the top plate 167 by screws 103.

Figures 17, 19:
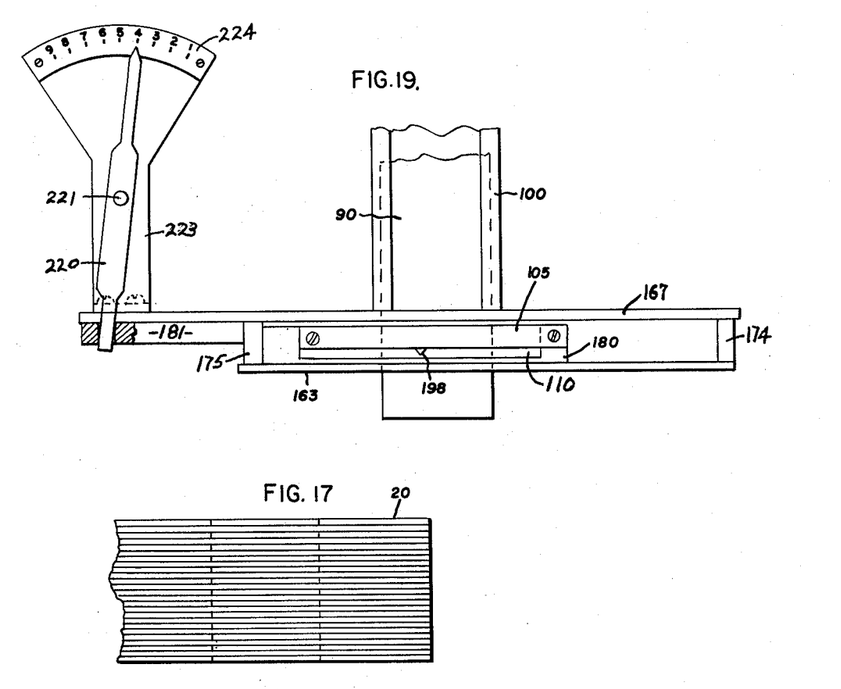
FIGURE 17 is a sectional view of the pad shown in FIGURE 16.
FIGURE 19 is a front elevational view of the shear structure shown in FIGURES 11–13 showing means for adjusting the mechanism to form additional identifying indicia on a tag.
Figure 20:
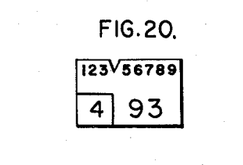
FIGURE 20 is an enlarged view of one of the severed tags.

As previously stated, each tag portion is provided with a large number, such as the number 4, and each tag portion is numbered consecutively with numbers 01 to 100 in each set of strips. Furthermore, a row of small numbers, as 1 to 9, is printed adjacent the top edge of each tag portion. Each tag portion may be notched in any one of a plurality of preselected positions to remove one of the small numbers 1 to 9. For example in FIGURE 19, the shear mechanism has been moved to the right to bring the notch 197 and projection 198 in registration with the small numeral 4. The severed tag notched at the small numeral 4 is shown in FIGURE 20.

To aid the operator in conveniently positioning the shear mechanism, the upper surface of the block 180 is formed with a recess in which there is a row of small indentations 213. A detent 215 is threaded into a boss 216 formed in the top plate 167 and has a spring pressed detent ball arranged to engage the indentations 213 in the block. The indentations 213 correspond with the position of the notch 197 and projection 198 in regard to their location in respect to the tag strip 90. The shear mechanism may be moved by a lever 220 pivoted at 221 to a bracket 223 fixed to the top plate 167, the upper end of the lever constituting a pointer movable over a graduated arcuate scale 224 bearing numbers 1 to 9 (see FIGURE 19).

This arrangement constitutes an important feature of our invention in that it provides for forming additional identifying indicia on the severed tag which is attached to the garment. In addition to the two large numbers pre-printed on the tag that may be conveniently used to identify the store and the piece, each sheet of tag strip may be formed of a different color paper to give further information. For example, the different colored pages of tag strips may indicate lots of one hundred pieces, or the color may indicate the day or date the pieces were received at the store, or the day or date they are to be ready for delivery.

If the laundry is a sizable operation, the color sequence is not practical for indicating lot numbers because a number of pads of tag strips may be used up in a day, or a week. If that happened, the laundry would have a number of garments having tags with the same piece number and the same color. To avoid such confusion, when the operator uses a second pad, the shear mechanism described in connection with FIGURES 9 through 13, is moved one position to the right so that the small numeral 2 at the top of each severed tag will be notched, indicating that such tag has been taken from the second pad. These small perforations, or notches, formed in the tags are also particularly beneficial in making a specific check-back where a claim has been made in regard to late delivery, mixed-up articles, etc. Such claims are often difficult to settle from invoices. For example, two different customers may both bring in similar black garments—one may be tagged with a tag from a second or third pad. However, this additional identifying indicia provided by the perforation or notch will readily indicate the customer for each garment.

In all instances, it will be noted that the shear structure is pivotally mounted for movement upwardly and away from the tag affixing means, such as the stapler. In the structure shown in FIGURES 1 to 13, the shear structure is retained in operative position by a spring blade 230 fixed to the frame side 33 and apertured to receive a pin 231 carried by the shear structure. In FIGURES 14 and 15, the shear structure is maintained in operative position by tension springs 233.

Another important feature of our invention resides in structure embodied in the machine for the convenient affixing of a second tag in the nature of a flag tag to indicate additional information about the piece being tagged as, for example, "button missing," "roll sleeves," "waterproof," "special," etc. It is now customary to attach such flag tags to the garment by pinning them to the garment. Often they become detached from the garment, or they are pinned to an area of the garment remote from the identifying tag, so that the special treatment does not come to the attention of the checker.

Referring to FIGURES 2, 4 and 5, a flag tag holder consisting of a pair of blades formed of thin, resilient metal are bent at right angles, with one leg of the angle formation attached to a bracket 237 by screws 238. The bracket 237 is pivotally mounted on a pin 239 carried by the stapler block 40. The bracket 237 is yieldingly urged to the position shown in FIGURES 2 and 3 that is, with the upwardly extending leg portions 240 of the holder diverging upwardly and outwardly from the stapler head. These blades frictionally retain a flag tag positioned between the blades and, as the garment platen 37 is moved towards the stapler, the blades 240 move inwardly to the position shown in FIGURE 5, whereby the staple is driven through the tag formed from the tag strip 90 and through the flag tag and garment. With this arrangement, the flag tag is quickly and conveniently attached to the garment simultaneously with the attachment of the regular identification tag.

The pad of tag strips P, FIGURE 2, is conveniently positioned on a plate 260 supported by a bracket 261 attached to the top of the wall 262 of a casing enclosing the machine, as by screws 263. The pad P is detachably secured to the pad, as by a pinch clamp 264.

Referring to FIGURE 1, the top margin 20 of the pad P is engaged by the pinch clamp 264, with the piece members in the tag strips reading consecutively from top to bottom. The strip, having the piece numbers 01 to 10 printed thereon, is positioned to the right end of the pad. The operator tears this strip from the pad by grasping the free lower end of the strip and inverting the strip in the tag strip guide 100, whereby the then lowermost tag portion of the strip bearing the piece number 01 is positioned in registration with the stapler head.

Tags are severed and affixed to the garment, and when the ten tags formed from this first strip are used up, the adjacent strip bearing the piece numbers 11 to 20 is similarly removed from the pad and inverted in the tag holder. This arrangement is particularly convenient for the handling of the tag strips and the forming and affixing of the tags to the garment. When the top sheet of tag strips have been removed from the pad, the interliner 21 is removed and the second sheet is available for use. The inner liner serves to avoid the possibility of the operator removing a tag strip out of place—that is, all the tag strips in a sheet will be removed before the strips in the next lower sheet is made available.

Our identification system provides for the accurate tagging of garments in a particularly convenient manner, and the system is particularly economical in that the sheets of tag strips can be pre-printed from plates, thus avoiding printing errors that occur when tags are printed with consecutive numbers in a continuous single width strip and supplied to the machine operator in the form of a roll of pre-printed tape. Any printing error in a roll of tape tags necessitates the discard of the entire roll, thereby substantially raising the tag printing cost. Also, as previously pointed out, our system very greatly reduces the necessary inventory required to be maintained by the laundry.

What we claim is:

1. A machine for affixing identification tags to garments and the like, comprising a frame, a tag affixing means, a garment supporting arm for moving a garment or the like in juxtaposition to said tag affixing means, means for positioning an identification tag in registration with said tag affixing means, a flag tag holder pivotally mounted on said tag affixing means and operable upon movement of said garment supporting arm for positioning a flag tag carried by said flag tag holder in registration with said tag affixing means, said tag affixing means being operable upon movement of said garment arm in juxtaposition thereto to affix said identification tag and flag tag to said garment.

2. A machine for affixing identification tags to garments comprising a frame, a tag affixing means, a garment supporting arm movable from a normal return position to an operative position for moving a garment into juxtaposition to said tag affixing means when said garment supporting arm is in its operative position, and said tag affixing means being operable upon movement of said garment supporting arm to its operative position to affix a tag to the garment, a shear structure mounted above said tag affixing means, a vertically disposed tag strip guide fixedly mounted on and extending upwardly from said shear structure for guiding a tag strip consisting of a plurality of tag forming portions, each of said portions bearing identification indicia, a tag strip stop carried by said tag affixing means for positioning the lowermost tag forming portion of said strip in overlying registration to said tag affixing means, said shear structure including a shear block formed with a tag strip guide channel, said channel forming a continuation of a tag strip guide channel formed in said vertically disposed tag strip guide, a shear blade slidably mounted on said shear block and being operable upon movement of said garment supporting arm to its operative position to sever said lowermost tag forming portion from said tag strip and provide a temporary stop for the remaining portion of said tag strip.

3. A machine as set forth in claim 2, wherein means are provided for connecting said garment supporting arm to said shear blade, said means being operable to retract said shear blade from its tag severing and temporary stop position only upon movement of said garment supporting arm to substantially the normal return position thereof.

4. A machine as set forth in claim 2, wherein said shear structure is pivotally mounted for vertical movement toward and from said tag affixing means.

5. A machine as set forth in claim 2, wherein said shear structure is pivotally mounted on said tag affixing means.

6. A machine as set forth in claim 2, wherein said shear block and said shear blade have cooperating portions operative upon severance of said lowermost tag forming portion from said tag strip to simultaneously remove a portion of said lowermost tag along the severed edge thereof to provide additional identifying indicia on said severed tag.

7. A machine as set forth in claim 6, wherein said shear structure including said shear block and said shear blade is adjustable transversely of the direction of movement of said tag strip to vary the position of said shear block and said shear blade to provide said additional identifying indicia in any one of a plurality of preselected positions along the severed edge of said lowermost tag.

References Cited in the file of this patent

UNITED STATES PATENTS

| | | |
|---|---|---|
| 1,043,511 | Davidson | Nov. 5, 1912 |
| 1,199,692 | Greenstein | Sept. 26, 1916 |
| 2,248,703 | Friedman | July 8, 1941 |
| 2,331,252 | Van Tugl | Oct. 5, 1943 |
| 2,422,543 | Hake | June 17, 1947 |
| 2,588,374 | Erickson | Mar. 11, 1952 |
| 2,682,306 | Schriber | June 29, 1954 |
| 2,796,607 | Filsinger et al. | June 25, 1957 |
| 2,815,811 | Feiertag | Dec. 10, 1957 |
| 2,849,934 | Braun | Sept. 2, 1958 |
| 2,877,695 | Braun | Mar. 17, 1959 |
| 3,012,484 | Braun | Dec. 12, 1961 |